United States Patent [19]

Martinez Vera et al.

[11] Patent Number: 4,528,030
[45] Date of Patent: Jul. 9, 1985

[54] METHOD OF REDUCING IRON ORE

[75] Inventors: Enrique R. Martinez Vera, Monterrey; Jorge O. Becerra-Novoa, Apodaca, both of Mexico

[73] Assignee: Hylsa, S.A., Monterrey, Mexico

[21] Appl. No.: 494,629

[22] Filed: May 16, 1983

[51] Int. Cl.³ .................................... C21B 13/02
[52] U.S. Cl. ......................................... 75/35
[58] Field of Search ................................. 75/35

[56] References Cited

U.S. PATENT DOCUMENTS

| | | | |
|---|---|---|---|
| 1,645,968 | 10/1927 | Percy | 75/35 |
| 2,739,055 | 3/1956 | Gallusser | 75/35 |
| 3,375,098 | 3/1968 | Marshall | 75/35 |
| 3,475,160 | 10/1969 | Heinzelmann et al. | 75/35 |
| 4,150,972 | 4/1979 | Price-Falcon et al. | 75/35 |
| 4,246,024 | 1/1981 | Price-Falcon et al. | 75/35 |
| 4,253,867 | 3/1981 | Price-Falcon et al. | 75/35 |
| 4,261,734 | 4/1981 | Price-Falcon et al. | 75/35 |
| 4,268,303 | 5/1981 | Kaneko et al. | 75/34 |
| 4,336,063 | 6/1982 | Guzman-Bofill et al. | 75/35 |
| 4,348,226 | 9/1982 | Aoki et al. | 75/35 |

Primary Examiner—Melvyn J. Andrews
Attorney, Agent, or Firm—Curtis, Morris & Safford

[57] ABSTRACT

A process for the gaseous reduction of iron ore to sponge iron in a vertical shaft, moving bed reactor wherein a hot gaseous mixture of hydrogen and a carbon monoxide is used to reduce the ore. It has been found unnecessary to use the external catalytic reformer of prior art processes to reform the methane and other hydrocarbon constituents of the natural gas commonly used as a source of gaseous reductants. By establishing a reducing gas recycle loop to which make-up natural gas and steam are fed in the proper proportions, the product sponge iron in the reactor can be used to catalyze hydrocarbon reformation, provided that the carbon content of the recycled gas is maintained low by removing carbon dioxide therefrom. Where pure methane is employed, steam/methane molar ratios within the preferred range of 1.4:1 to 2.2:1 are used.

23 Claims, 1 Drawing Figure

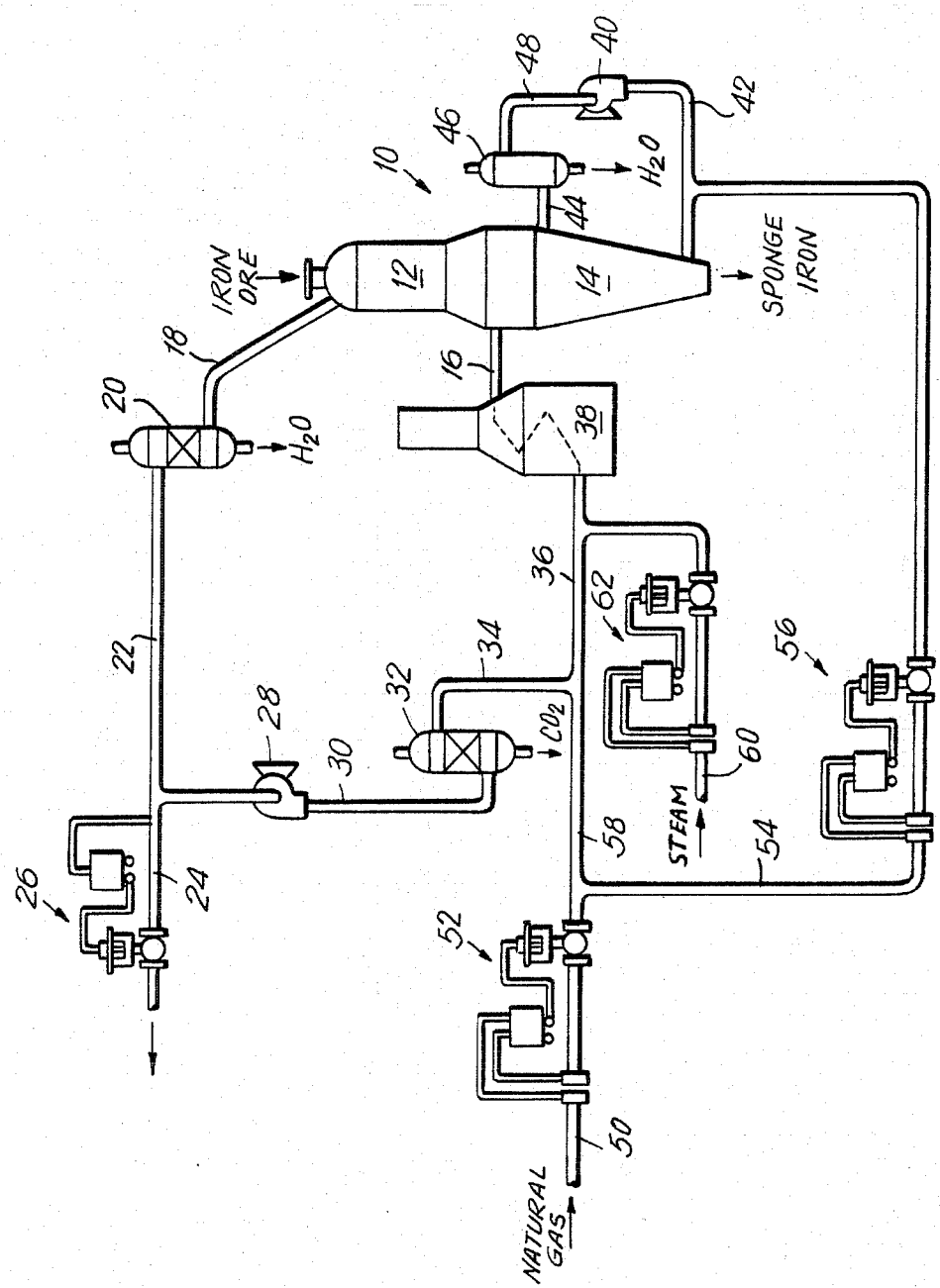

METHOD OF REDUCING IRON ORE

FIELD OF THE INVENTION

This invention relates generally to a process for reducing particulate iron ore to sponge iron in a vertical shaft, moving bed reactor using a hot reducing gas mixture derived from natural gas and more particularly, to a process of this type that eliminates the necessity for using an external reformer to convert the hydrocarbon content of the natural gas etc. (primarily methane) into carbon monoxide and hydrogen before introducing the reducing gas into the reactor.

BACKGROUND OF THE INVENTION

It has long been known that the reduction of iron ore to produce iron in a form suitable for steel-making can be carried out at temperatures below the melting point of iron by passing a hot reducing gas through a bed of particulate iron ore at temperatures of the order of 700° to 1000° C. to produce sponge iron. Because of its wide availability, natural gas (typically reported as containing 75%, 85%, or more of methane), has been extensively used as a source of the reducing gas for such sponge iron processes. It is well known that natural gas also contains lesser amounts of other simple hydrocarbon homologs, such as ethane (on the order of 10%), propane, butane, and even pentane, etc. Thus, constituent percentages range considerably, dependent upon the particular source. As is commonly recognized, and as used herein, natural gas does not contain any more than trace amounts of hydrogen or carbon monoxide (being substantially less than 1%). However since methane per se, and the other lower molecular weight paraffin hydrocarbons present in natural gas (whether alone or in combination), are relatively ineffective reducing agents for iron ore, it has been customary to convert the methane and/or the other lower hydrocarbons into a mixture of carbon monoxide and hydrogen for use as ore-reducing agents. More particularly, a mixture of natural gas and steam is catalytically converted into a carbon monoxide and hydrogen mixture in a reformer and the resulting upgraded reducing gas mixture is heated, if necessary, and passed through a bed of particulate iron ore to convert it to sponge iron.

Typical gaseous reduction systems are disclosed, for example, in U.S. Pat. Nos. 3,765,872; 4,099,962; 4,150,972; 3,748,120; 4,046,557 and 3,905,806. Such systems commonly comprise vertical reactors having a reducing zone in the upper portion thereof wherein the hot reducing gas flows upwardly counter-current to a descending body of iron ore, and a cooling zone in which the reduced ore in the form of sponge iron is cooled with a cooling gas. The spent reducing gas removed from the top of the reducing zone is de-watered, mixed with fresh reducing gas from the reformer, reheated and recycled to the reducing zone of the reactor.

While reduction systems using reformed natural gas as a reducing agent have been extensively used commercially, they are open to the serious objection that the catalytic reformers they employ are costly pieces of equipment and form a substantial part of the investment in such a sponge iron producing plant. Hence a process capable of producing high quality sponge iron without using an external reformer would substantially reduce the capital cost of such a plant.

As indicated above, natural gas per se is an unsatisfactory reducing agent for use in an iron ore reduction reactor for a number of reasons. Thus the reduction reaction rate using a gas containing mainly methane and/or its homologs as the reducing agents is substantially less, at a given temperature, than the reaction rate for mixtures of carbon monoxide and hydrogen. While it is true that the reaction rates for methane and its homologs can be increased by raising the temperature, the higher temperatures required to achieve an acceptable reaction rate lead to other problems. Thus at temperatures above about 1000° C. methane decomposes, especially in the presence of iron, to form solid carbon in the form of soot that coats the iron-bearing material and restricts access of the gas to the interior of the particles or pellets to be reduced.

Moreover, at such elevated temperatures there is a tendency for the reduced ore to sinter and agglomerate into large aggregates. In order to achieve acceptable operation of a vertical shaft, moving bed reactor, a free flow of the particles or pellets through the reactor, and particularly through any reduced cross-sectional areas of the reactor, is essential. The formation of large irregular aggregates, can in some cases, completely block the flow of solids in the reactor and also cause undesirable channeling of the gas flow therethrough.

Still further, the reduction reactions that occur in the reactor are generally endothermic and hence the feed gas must be heated outside the reactor to provide the necessary reaction heat. The use of high reaction temperatures increases the reducing gas heating costs.

One effort to solve the foregoing problems is disclosed in Kaneko et al. U.S. Pat. No. 4,268,303. In accordance with the disclosure of this patent the reduction of the ore is carried out in two stages. In the first reduction stage, methane gas is used as a make-up gas and the reduction is carried out to the point where a metallization of 30% to 80% is attained. The final reduction up to about 95-98% is achieved in a second stage wherein a reformed gas largely composed of carbon monoxide and hydrogen is employed. Since no reformer is needed to produce the first stage reducing gas, the reformer can be relatively small. However, a reformer to produce the second stage reducing gas is still required if an acceptably high metallization is to be attained. A disadvantage of the process of this patent is the extremely high capital costs, because of the higher operating temperature of the gas heater. Another disadvantage is the greater heat losses inherent in operating at such high temperatures.

It has been generally recognized in this art that methane and its homologs can not, as a practical matter, be used directly per se without prior conversion to $H_2$ and CO in the direct reduction of iron ore. For example, it is stated in the article "the reduction of iron oxides in a methane gas "uniflow" by A. Domsa and Z. Sparchez of the Polytechnic Institute Cluj, Bulgaria, (Cercetari Metalurgice, Vol. 9, 1967, p. 133-141), that methane can reduce iron ore effectively only at elevated temperatures, above 1000° C. Such theoretical use at temperatures above 1000° C. is not practical because of the agglomeration problems discussed elsewhere. Contrary to this teaching, the applicants have discovered that a steady state direct addition of methane (typically in the form of natural gas) can be achieved in the temperature range of 800° to 1000° C., more preferably from 900° to 960° C.

SUMMARY OF THE INVENTION

It is accordingly an object of the present invention to provide a sponge iron production process of the foregoing type in which no external catalytic reformer is required. It is another object of the invention to provide such a process wherein natural gas per se is used as a make-up gas. Other objects of the invention will be in part obvious and in part pointed out hereafter.

The present invention can be usefully incorporated in a continuous reaction system of the general type referred to above wherein a hot reducing gas flows upwardly through a descending bed of particulate ore, in the reduction zone of a reactor, spent gas is removed near the top of the reduction zone and dewatered and the dewatered gas is heated and returned to the bottom of the reduction zone to form a reducing gas loop. The objects and advantages of the invention are achieved in general by feeding to the reducing gas loop as make-up gas, steam and methane in a molar ratio of 1.4:1 to 2.2:1 and by removing carbon dioxide from the gaseous mixture flowing through the loop. It has been found that by adding natural gas and steam in the proper proportions to the recycled reducing gas, metallizations of 90% or greater can be achieved at temperatures of 900° to 1000° C. without any external reformer at all and without the formation of large agglomerates. When natural gas rather than pure methane is used in the make-up gas, those of ordinary skill in the art will appreciate that the foregoing molar ratio can still be used as a good approximation for simplicity of calculation (where the natural gas is assumed to be essentially all methane). However, such artisans will also readily appreciate that since natural gas contains hydrocarbons having two or more carbon atoms per molecule to combine with the molecules of steam; therefore, this ratio is more precisely applied as a steam to carbon-atom molar ratio (where the molar carbon-atom content of concern is that of the hydrocarbons present in the natural gas). See for example, the first four paragraphs of the article *Operator Calculations for Reforming–Furnace Steam Flows*, Sept. 30, 1974, Chemical Engineering at page 150. Moreover, as further pointed out below, by adjusting the ratio of steam to carbon in the make-up gas the carbon content of the sponge iron produced can be selectively varied over a useful range.

DESCRIPTION OF A PREFERRED EMBODIMENT

The objects and advantages of the present invention can best be understood and appreciated by reference to the accompanying drawing which illustrates diagrammatically apparatus capable of carrying out a preferred embodiment of the invention. Referring to the drawing, the numeral 10 designates a conventional vertical shaft, moving bed, gaseous reduction iron ore reduction reactor having a reduction zone 12 in the upper part thereof and a cooling zone 14 in the lower part thereof. Iron ore is fed to the top of zone 12 and cooled sponge iron is removed at the bottom of zone 14. The reduction zone 12 of reactor 10 forms part of a reducing gas loop. Hot reducing gas largely composed of hydrogen and carbon monoxide flows through a pipe 16 to the bottom of the zone 12 and thence upwardly through the body of particulate ore therein to reduce the descending ore to sponge iron. Off-gas leaves the reactor through a pipe 18 and is cooled and de-watered in a cooler 20 having a gas outlet pipe 22. The gas flowing through pipe 22 is divided; one portion thereof is removed from the system through pipe 24 containing back pressure regulator 26 and the remainder is recycled to the reduction zone 12. More particularly, the recycled portion of the cooled and de-watered gas is pumped by pump 28 through pipe 30 to a carbon dioxide absorption unit 32 wherein $CO_2$ is removed from the recycle gas to reduce the carbon content thereof. From absorption unit 32 the recycle gas flows through pipes 34 and 36 to a heater 38 wherein it is heated to a suitable temperature e.g. 950° C. and thence flows through pipe 16 to the reduction zone.

The cooling zone 14 of reactor 10 also forms part of a gas recycle loop. Cooling gas is pumped by a pump 40 through a pipe 42 to the bottom of cooling zone 14 and flows upwardly through the descending body of particulate sponge iron to cool it. The recycled gas, withdrawn from the top of cooling zone 14 through a pipe 44, is cooled in a cooler 46 and returned through pipe 48 to the suction side of pump 40.

It has been customary in gaseous reduction systems of the foregoing type to use as the make-up reducing gas supplied to the reducing gas loop, a preformed mixture of carbon monoxide and hydrogen obtained by the catalytic reformation of a mixture of natural gas and steam in a reformer. As indicated above, the use of such an external catalytic reformer substantially increases the capital investment required for such a reduction plant. The present invention is based on the discovery that the external reformer can be completely dispensed with and satisfactory reduction can be achieved with no increase in the reducing gas feed temperature by supplying make-up natural gas and steam to the reducing gas recycle loop in the proper proportion and removing carbon dioxide from the recycle loop to prevent excessive carbon deposition on the iron-bearing material in the reduction zone.

Reverting to the drawing, natural gas from a suitable source enters the system through a pipe 50 containing a flow controller 52. The entering natural gas is divided: a portion thereof flows through pipe 54 containing flow controller 56 to the cooling loop and the remainder flows through pipe 58 to the reducing gas loop. Steam is supplied through pipe 60 containing flow controller 62 and enters the reducing gas loop near the point of introduction of the natural gas. Thus the make-up natural gas and steam are mixed with each other and with the recycle gas before they are heated and fed to the reactor.

From the foregoing description it should be apparent that iron ore reduction systems embodying the present invention are capable of achieving the several objectives set forth at the beginning of the specification. Effective and efficient reduction of the ore to produce sponge iron is obtained without the use of a separate catalytic reformer and without using the undesirably high temperatures employed in prior art processes using unreformed methane as a make-up gas. It appears that when methane and steam are added to the recycle gas in the proper proportions, the desired reformation of the methane to produce hydrogen and carbon monoxide for ore reduction is catalyzed by the product sponge iron within the reactor. By removing carbon dioxide from the recycled gas, the carbon content thereof is maintained relatively low, (from about 1.3% to 2.5%) so that adjustment of the mol ratio of added steam to methane within the range 1.4:1 to 2.2:1 can be used to achieve predeterminable relatively low carbon contents in the sponge iron. Moreover, with the present process the methane or natural gas required per ton of sponge iron produced is appreciably lower than in prior art processes.

It is of course to be understood that the foregoing description is intended to be illustrative only and that numerous changes can be made in the specific embodiment disclosed without departing from the spirit of the invention as defined in the appended claims.

We claim:

1. A method of reducing particulate iron ore in a vertical shaft, moving bed reactor by a reducing gas formed therein from make-up gases mainly composed of gaseous hydrocarbon and steam, with said reactor having a reduction zone in which said ore is reduced to sponge iron, which comprises:
   feeding to said reduction zone hot recycle gas and make-up gases largely comprised of hydrogen, carbon monoxide, gaseous hydrocarbon, and steam,
   causing said gases to flow through at least a portion of said bed to effect reduction of the ore therein and to effect reformation of gaseous hydrocarbon with steam therein to yield a resulting off-gas,
   essentially all said hydrogen and carbon monoxide being derived by said reformation within said reactor,
   withdrawing the off-gas from said reduction zone,
   de-watering and removing carbon dioxide from such off-gas to yield a resulting upgraded gas,
   re-heating the upgraded gas and returning such upgraded gas as the recycle gas to said reduction zone thereby forming a reducing gas recirculation loop, and
   feeding make-up gases substantially comprised of steam and gaseous hydrocarbon to said upgraded recycle gas in said loop.

2. A method according to claim 1, wherein the reactor has a cooling zone in the lower portion thereof for cooling said sponge iron by a cooling gas loop, and wherein the make-up gaseous hydrocarbon and steam is added to said reducing gas loop beyond the points of removal of water and carbon dioxide and before the point at which the circulating gas is re-heated.

3. A method according to claim 1, further comprising maintaining a molar ratio of steam to gaseous hydrocarbon carbon-atoms fed to the upgraded recycle gas in said loop in the range of 1.4:1 to 2.2:1.

4. A method according to claim 1, wherein the gaseous hydrocarbon is at least mainly methane.

5. A method according to claim 1, wherein said gaseous hydrocarbon is at least mainly methane.

6. A method according to claim 5, wherein the methane and steam are mixed before being added to said reducing gas loop.

7. A method according to claim 15, wherein the methane and steam are added separately to said reducing gas loop.

8. A method according to claim 4, wherein said gaseous hydrocarbon is natural gas.

9. A method according to claim 1, wherein said gaseous hydrocarbon is natural gas.

10. A method according to claim 1, wherein methane is added as a make-up gas to a cooling gas loop in a cooling zone for cooling sponge iron received from said reduction zone.

11. A method according to claim 5, wherein methane is added as a make-up gas to the cooling gas loop in said cooling zone.

12. A method according to claim 1, wherein the temperature in said reduction zone is maintained between 850° C. and 1000° C.

13. A method according to claim 5, wherein the temperature in said reduction zone is maintained between 850° C. and 1000° C.

14. A method according to claim 10, wherein the temperature in said reduction zone is maintained between 850° C. and 1000° C.

15. A method according to claim 1, further comprising maintaining a molar ratio of steam to gaseous hydrocarbon carbon-atoms fed to the upgraded recycle gas in said loop of up to 2.2:1.

16. A method according to claim 3, wherein the reactor has a cooling zone in the lower portion thereof for cooling said sponge iron by a cooling gas loop, and wherein the make-up gaseous hydrocarbon and steam is added to said reducing gas loop between the point of removal of carbon dioxide and the point at which the circulating gas is re-heated.

17. A method according to claim 1, wherein significantly more than 30% of the content of said make-up gases apart from steam is gaseous hydrocarbon.

18. A method according to claim 5, wherein significantly more than 30% of the content of said make-up gases apart from steam is gaseous hydrocarbon.

19. A method according to claim 18, wherein said make-up gases consist essentially of steam and gaseous hydrocarbon.

20. A steady-state method of reducing particulate iron ore in a vertical shaft, moving bed reactor by a reducing gas formed therein from make-up gases essentially composed of gaseous hydrocarbons and steam, with said reactor having a reduction zone in which said ore is reduced to sponge iron, which comprises:
   feeding to said reduction zone an upgraded recycle gas and make-up gases in a temperature range of from 800° C. to 1000° C. which are largely comprised of hydrogen, carbon monoxide, gaseous hydrocarbon, and steam,
   causing said gases to flow through at least a portion of said bed to effect reduction of the ore therein and to effect reformation of gaseous hydrocarbon with steam therein to yield a resulting off-gas,
   essentially all said hydrogen and carbon monoxide added to said gaseous mixture during steady state operation being derived by said reformation within said reactor,
   withdrawing the off-gas from said reduction zone,
   de-watering and removing carbon dioxide from said off-gas to yield a resulting upgraded gas,
   re-heating the upgraded gas and then returning such upgraded gas as the recycle gas to said reduction zone thereby forming a reducing gas recirculation loop, and
   feeding make-up gases consisting essentially of steam and gaseous hydrocarbon to said upgraded recycle gas in said loop.

21. A method according to claim 20, further comprising maintaining a molar ratio of steam to gaseous hydrocarbon carbon-atoms fed to the upgraded recycle gas in said loop in the range of 1.4:1 to 2.2:1.

22. A method according to claim 20, wherein said gaseous hydrocarbon is at least mainly methane, and further comprising maintaining a molar ratio of steam to methane fed to the upgraded recycle gas in said loop in the range of 1.4:1 to 2.2:1.

23. A method according to claim 22, wherein said gaseous hydrocarbon is natural gas and said temperature range is about 900° to 960° C.

* * * * *

UNITED STATES PATENT AND TRADEMARK OFFICE
CERTIFICATE OF CORRECTION

PATENT NO. : 4,528,030

DATED : July 9, 1985

INVENTOR(S) : Enrique R. Martinez-Vera, et al.

It is certified that error appears in the above-identified patent and that said Letters Patent is hereby corrected as shown below:

```
Column 5, line 49 (claim 4, line 1) delete "the" and
                  insert --said--;
          line 51 (claim 5, line 1) delete "1" and
                  insert --16--;
          line 61 (claim 9, line 1) delete "1" and
                  insert --16--;
Column 6, line 18 (claim 16, line 5) delete "between the point"
                  and insert --beyond the points--;
          line 19 (claim 16, line 6) after "of" insert
                  --water and --, after "and" insert --before--.
```

Signed and Sealed this

Eighth Day of October 1985

[SEAL]

Attest:

Attesting Officer

DONALD J. QUIGG

Commissioner of Patents and Trademarks—Designate